April 25, 1961 D. B. BOLINGER 2,980,944
WHEEL AND SWIVEL BRAKE DEVICE
Filed Sept. 24, 1957 2 Sheets-Sheet 1
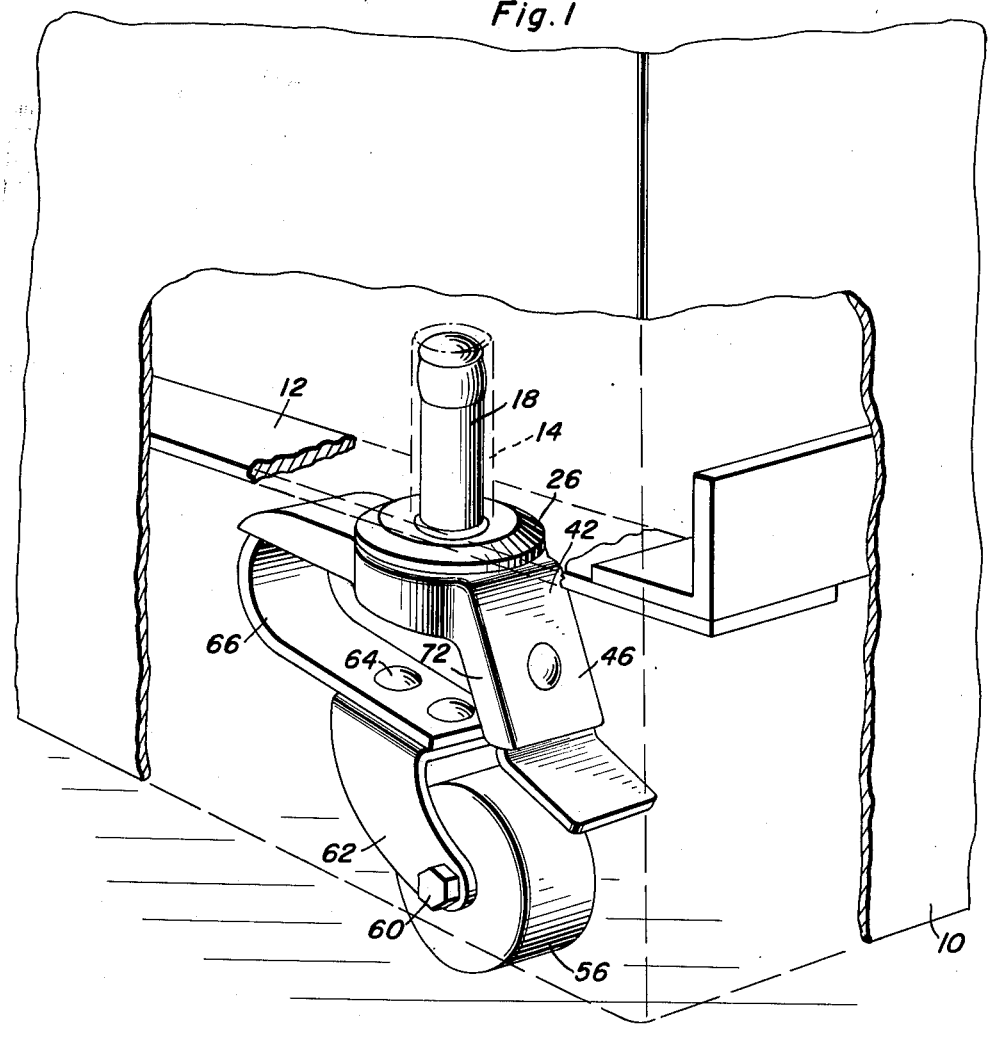
Fig. 1
Fig. 3
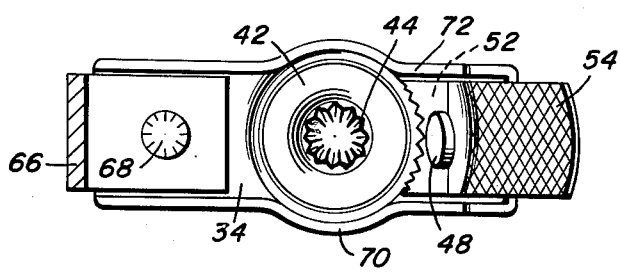
Donald B. Bolinger
INVENTOR.

April 25, 1961 D. B. BOLINGER 2,980,944
WHEEL AND SWIVEL BRAKE DEVICE
Filed Sept. 24, 1957 2 Sheets-Sheet 2
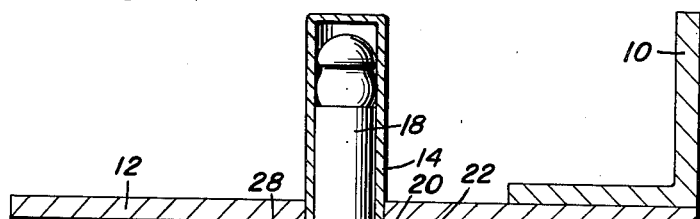
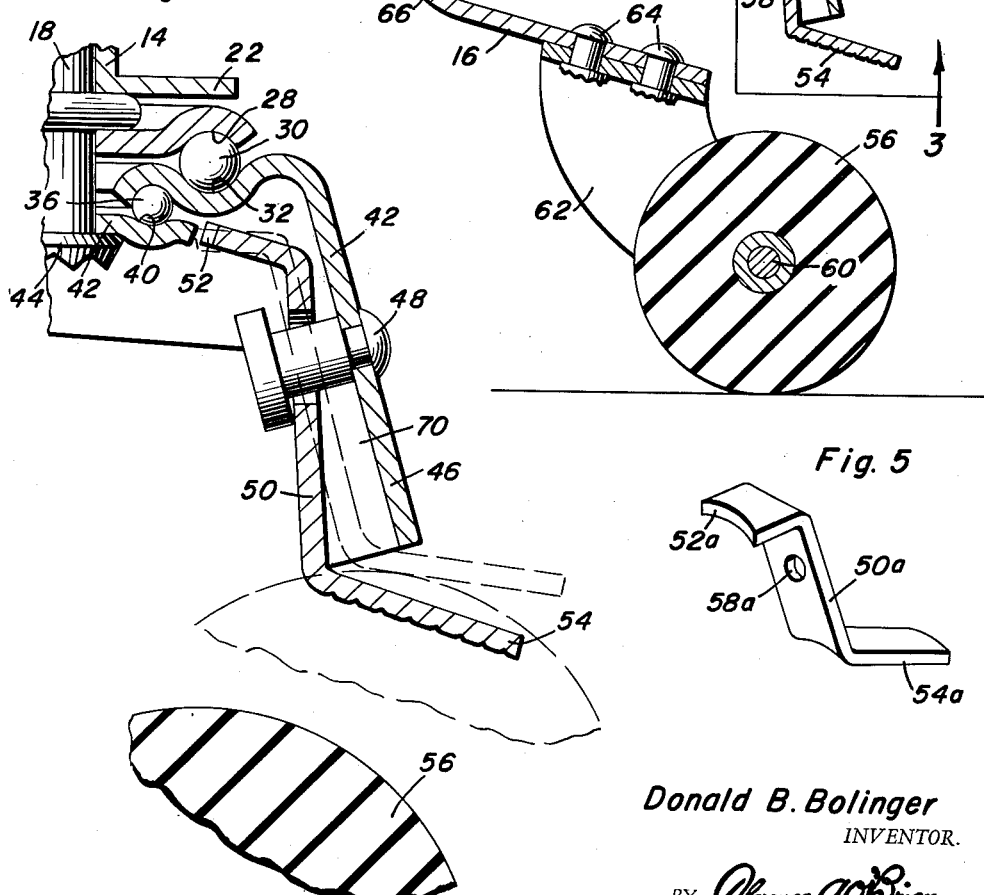
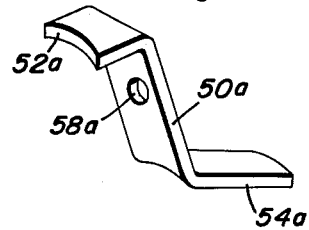
Donald B. Bolinger
INVENTOR.

United States Patent Office
2,980,944
Patented Apr. 25, 1961

2,980,944

WHEEL AND SWIVEL BRAKE DEVICE

Donald B. Bolinger, 305 Normal Ave., Normal, Ill.

Filed Sept. 24, 1957, Ser. No. 685,884

4 Claims. (Cl. 16—35)

This invention relates to wheel assemblies, principally casters, and more particularly to brakes that are operatively connected with such assemblies.

I am aware of prior devices for locking wheels of casters or wheels which are mounted for rotation on a fixed axle. Some are operative automatically in response to a weight load. Others have means by which to fix the wheel against rotation. My present invention provides an improvement in the general class of caster wheels or other types of wheels in that the wheel is automatically locked in response to a weight load and at the same time the swivel assembly is locked against rotation about its axis. The locking actions are practically simultaneous.

A more particular object of the invention is to provide a wheel assembly capable of at least partial rotation about a first fixed axis, plus a wheel which is rotatable about a transverse axis, and in such a wheel assembly have automatically operative means for holding the assembly against rotation about the fixed axis and for preventing the wheel from rotating. These means are preferably of a mechanical nature and of simplified construction so as to be practical and capable of wide commercial use as a substitute for an ordinary caster.

Wheel assemblies constructed in accordance with the invention may be used as original equipment in domestic or industrial furnature, and it is an important feature of the invention that the wheel assembly may be substituted for ordinary casters that are now in use. My wheel assemblies may be used with altered or unaltered furniture. A primary purpose of my swiveling device is that it be used on metal bed frames so that the bed might be easily moved for cleaning and making up the bed and still remain in a locked position when being sat or slept upon.

I have found that merely locking the wheel of a caster assembly is insufficient to do a complete job of holding furniture against movement once someone becomes seated thereon. I have particular reference to sofa beds or like furniture that should be mobile but yet, must double as a seat. The wheels can be locked by using chocks or by prior locking devices, certain of which have been described in my copending applications for patent. However, those devices which operate wholly on the wheel do not prevent the entire caster assembly from swiveling.

My invention accomplished the desired result of locking the entire caster assembly against swivel action and also of locking the wheel against further rotation once a load is applied to the object with which the wheel assembly of my invention is connected.

One of the principal embodiments of my invention uses an ordinary caster spindle in addition to the ordinary swivel having a lower collar crimped or otherwise attached to the spindle and to which the wheel supporting fork is generally connected. I add the spring by which a wheel supporting fork is suspended and a brake member with brake surfaces arranged to simultaneously contact the periphery of the wheel and the periphery of the collar of the swivel thereby locking the wheel assembly against both rotation of the wheel and rotation of the wheel supporting fork.

Other objects and features of importance will become apparent in following the description of the illustrated form of the invention.

Figure 1 is a corner perspective view of a fragment of an article of furniture with parts broken away to illustrate a wheel assembly constructed in accordance with the invention.

Figure 2 is a longitudinal sectional view of the wheel assembly of Figure 1.

Figure 3 is a sectional view taken on the line 3—3 of Figure 2.

Figure 4 is a fragmentary enlarged sectional view showing the engaged and disengaged positions of the brake of my wheel assembly.

Figure 5 is a perspective view of a modification of the brake.

In the accompanying drawings there is an article of furniture 10 which schematically represents any kind of furniture having need or use for a caster or other wheel assembly that can use one of the assemblies of my invention. The article of furniture 10 has a support 12 within which sleeve 14 is fitted and carried. The sleeve is rigidly held in place by standard means for achieving this. The support 12 schematically represents any kind of any support of any kind of furniture and this includes legs as well as frames.

Wheel assembly 16 is constructed of a spindle 18 which fits and locks in sleeve 12 but which is capable of rotating about the longitudinal axis of the spindle. Spindle 18 is standard in many casters that are commercially available at the present time. Bushing 20 is also a standard part, being attached onto the spindle 18 and adapted to bear against the flange 22 of sleeve 14.

Swivel 24 of the wheel assembly is constructed of an upper plate 26 that has a raceway 28 within which a number of balls 30 are disposed. These balls are disposed also in a lower raceway 32 that is formed in the mounting plate 34 and that constitutes a part of my invention. Lower balls 36 are held captive in a downwardly opening raceway 38 of mounting plate 34 and seat in an upwardly opening raceway 40 in collar 42. This collar is swaged, pressed, welded, riveted or otherwise secured to the lower extremity of spindle 18 so that it is immovable with respect to the spindle. A peened head 44 is selected for an illustration of how collar 42 can be fastened in place.

Mounting plate 34 has a depending front part 46 that rigidly supports rivet 48 or some other fastener for brake member 50. The brake member has two brake surfaces 52 and 54 for frictionally contacting the periphery of collar 42 which forms another brake member and the periphery of wheel 56. The brake member 50 has an enlarged hole 58 through which the fastener, as rivet 48, is loosely passed with the head of the fastener preventing separation of the brake member 50 from the front part of the mounting plate but allowing the brake member to move the braking and release positions.

Wheel 56 is mounted for rotation on wheel axle 60, and this is carried by fork 62. The cross member of the fork is attached, as by rivets 64 to one end of a flat spring 66. The flat spring is bowed (Figure 2) with the opposite end connected by a fastener or fasteners, as rivet 68, to the mounting plate 34. This construction mounts wheel 56 resiliently so that it is capable of moving upward in response to a load applied to the article of furniture with which the assembly 16 is connected.

It is preferred, but not essential, that there be side panels 70 and 72 depending from the longitudinal edges of mounting plate 34. These function as guides for the brake member 50 and provide additional support and rigidity for the connection that is made at fastener 68.

A modification of my invention contemplates the use of smooth braking surfaces, as surface 52a and 54a of the brake member 50a of Figure 5. Otherwise, the brake surfaces as at 52 and 54 will be scored, serrated or otherwise textured to enhance the frictional connection between them and the parts that they are to brake. It is within the contemplation of the invention to coat the brake surfaces, for example by bonding elastomeric plastics or rubber to these surfaces or by adhering other material foreign to the metal brake member 50. The shape of the brake member 50 (Figure 2) has a Z-section but this may be altered somewhat without departing from the invention.

In operation the wheel assembly 16 will function exactly like any ordinary caster. The wheel, spring 66, mounting plate 34 and other parts associated with them are capable of rotation about an axis passed longitudinally through the spindle 18. When a light load is applied to the article of furniture or the like whereon the wheel assembly 16 is connected, nothing will happen. But, when a weight load of predetermined proportions, and this may be light or heavy, is applied to the article 10, spring 66 deflects enabling the periphery of wheel 56 to abut the brake surface 54. This action moves the brake member 50 as shown in the dotted line position of Figure 4 and brings the surface 52 or 52a or another surface which corresponds thereto, into contact with the periphery of collar 42. A braking action against rotation about the axis of spindle 18 is achieved in this way and this is for all practical purposes, simultaneous with the application of the braking force on the periphery of wheel 56.

It is understood that various changes may be made without departing from the following claims. For example, sleeve 14 is shown as cylindrical. This need not be the case. In fact the braking action is so effective that the sleeve has actually turned in its socket, indicating that a non-circular sleeve is justified, or additional locking means could be used. Moreover, my assembly has equal use with the kinds of casters shown and described but also with others among which are the plate types.

For so much of the subject matter of my application, Serial No. 655,370, filed April 26, 1957, now Patent No. 2,942,698, as is common to this application, a continuation-in-part thereof, I claim the benefit of the filing date of that application.

What is claimed as new is as follows:

1. In a wheel assembly the combination of a spindle which is adapted to be fixed in place, a mounting plate, means including bearings mounting said mounting plate for rotation on said spindle, a first brake member attached to said spindle, a second brake member connected with said mounting plate and engageable with said first brake member to prevent said mounting plate from rotation with respect to said spindle, a wheel, resilient means mounting said wheel for deflection with respect to said spindle, and said second brake member engageable with said wheel to prevent said wheel from rotating when said spring is deflected and simultaneously move said second brake member against said first brake member as aforesaid.

2. The combination of claim 1 wherein said resilient means comprise a leaf spring having a bow between its ends to define a pair of bow connected sections that are approximately parallel, said brake member comprising a mechanical element that has an opening, means passed through said opening loosely connecting said mechanical element to said mounting plate, and said brake surfaces being at spaced places on said mechanical element.

3. The combination of claim 2 wherein said mounting plate has side panels between which said mechanical element is mounted so that said side panels function as guides for said mechanical element.

4. The combination of claim 3 wherein said resilient means comprise a flat spring which has a bowed part, and a wheel fork connected to one end of said spring and the other end of said spring located between said panels and fastened to said mounting plate.

References Cited in the file of this patent

UNITED STATES PATENTS

| | | |
|---|---|---|
| 1,633,638 | Jarvis et al. | June 28, 1927 |
| 1,755,537 | Deisler | Apr. 22, 1930 |
| 2,033,146 | Motycka | Mar. 10, 1936 |
| 2,345,442 | Winter et al. | Mar. 28, 1944 |
| 2,445,865 | Sleeper | July 27, 1948 |
| 2,453,916 | Inskeep | Nov. 16, 1948 |
| 2,572,548 | Weisz et al. | Oct. 23, 1951 |
| 2,885,720 | Seeberger | May 12, 1959 |